United States Patent [19]

Cook

[11] Patent Number: 5,743,541
[45] Date of Patent: Apr. 28, 1998

[54] STOWABLE UTILITY TRAILER

[76] Inventor: Michael James Cook, 8112 Pierpoint Dr., Harrison, Tenn. 37341

[21] Appl. No.: 661,826

[22] Filed: Jun. 11, 1996

[51] Int. Cl.⁶ .................................................. B62D 63/06
[52] U.S. Cl. .................... 280/43.13; 280/414.5; 280/491.1; 280/656
[58] Field of Search ........................ 280/43, 46, 43.13, 280/43.14, 43.17, 400, 414.5, 415.1, 475, 491.1, 656, 789

[56] References Cited

U.S. PATENT DOCUMENTS

| | | | |
|---|---|---|---|
| 390,048 | 9/1888 | Wenzel | 280/46 |
| 2,469,506 | 5/1949 | Kerr et al. | 280/400 |
| 2,515,379 | 7/1950 | Paine | 280/414.5 |
| 2,806,710 | 9/1957 | Mascaro | 280/414.5 |
| 3,091,476 | 5/1963 | Blake | 280/43.13 |
| 3,095,306 | 6/1963 | Janes | 280/415.1 |
| 3,944,248 | 3/1976 | Herrman | 280/43.13 |
| 4,480,851 | 11/1984 | St-Pierre | 280/656 |
| 4,529,220 | 7/1985 | Wright et al. | 280/656 |
| 4,595,210 | 6/1986 | Groeing | 280/414.5 |
| 5,161,814 | 11/1992 | Walker | 280/656 |

FOREIGN PATENT DOCUMENTS

| | | | |
|---|---|---|---|
| 6010749 | 8/1977 | Australia | 280/656 |
| 8602326 | 4/1986 | WIPO | 280/656 |

*Primary Examiner*—Thomas B. Will
*Assistant Examiner*—John L. Beres
*Attorney, Agent, or Firm*—Alan Ruderman

[57] ABSTRACT

A light weight utility trailer which may be readily converted between an operative and a stowable configuration includes a bed or body that pivotally carries a stud shaft to which a tow bar is secured. A pair of wheels are supported by a shaft pivotally connected to the bed. A first sprocket is secured to the pivot shaft and a second sprocket secured to the wheel support shaft, and a chain is trained about both sprockets. When the tow bar is rotated from the operative position extending forwardly of the bed to a stowable position beneath the bed, the stud shaft is thereby rotated and rotates the wheel support shaft by means of the chain from the operative position extending downwardly beyond the bottom of the bed to an inoperative position wherein the wheels are raised above the bottom of the bed. In the stowable position the wheels are within the profile of the sides of the bed and thus the trailer may be stowed in a minimum of space. Springs are provided to bias the wheel support shaft to rotate toward the operative position until the tow bar has been moved beyond a mid-point position in its travel toward the stowable position, at which time the springs move over-center and urge the wheel support shaft to the stowable position. Fenders are provided above the wheels in the operative position and are moved to a stowable position as the wheels are moved.

19 Claims, 3 Drawing Sheets

STOWABLE UTILITY TRAILER

BACKGROUND OF THE INVENTION

This invention relates to a trailer which may be converted from an operative configuration to a stowable configuration, and more particularly to such a trailer wherein the tow bar may be pivoted about an axis to move the trailer wheels from the operative configuration below the bed of the trailer to the stowable configuration with the wheels disposed within the profile of the sides of the bed.

The prior art has for some time endeavored to develop a trailer which could be stowed in a minimum space when not in use. In the known prior art such a trailer requires several time consuming steps in order to convert from a stowed configuration to an operative configuration. In most cases the convertible feature caused the trailer to be excessively heavy and thus not maneuverable easily into stowage. For example, in Kerr et al U.S. Pat. No. 2,469,506 the tow bar is guided within a sleeve, and as the bar is pushed rearwardly the wheels collapse beneath the body of the trailer, the wheels being supported on swinging arms connected to links pivotably journalled by a universal connection to the tow bar to fold the wheels 90 degrees from the operative position. This proposal created a structure which is obviously heavy and complicated. In St. Pierre U.S. Pat. No. 4,480,851, which requires some six steps to convert from one configuration to another, the wheels swing about an axle as the wheel brackets are manually rotated and then locked into position. The tow bar is separately rotated and locked in position. In Walker U.S. Pat. No. 5,161,814, a trailable frame may be converted into a trailer on retractable wheel assemblies, a removable towing member acting against a linkage to rotate the wheels to the trailer or static position. Again, a number of steps are required to convert the structure to and from a mobile frame, and in fact the structure is not even a stowable trailer but merely a structure with extendible/retractable wheel assemblies.

Accordingly, the prior art has not provided a satisfactory solution to the construction of a trailer which may be converted between an operative and a stowed configuration in a simple and easy manner.

SUMMARY OF THE INVENTION

Consequently, it is a primary object of the present invention to provide a utility trailer which can be converted readily between an operative and a stowed configuration in a simple and easy manner.

It is another object of the present invention to provide a utility trailer which may be stowed on the tail end of the bed with the wheels disposed within the profile of the sides of the bed, the wheels being movable between the operative position and the stowed position simultaneously with the tow bar.

It is a further object of the present invention to provide a utility trailer which can be converted readily between an operative configuration wherein the wheels of the trailer are disposed below the bottom of the bed of the trailer for rolling on a road surface and the trailer may be pulled by a tow bar at the forward end of the trailer, and a stowed position wherein the wheels are raised above the bottom of the bed and disposed within the profile of the sides of the trailer and with the tow bar folded beneath the bed, rotation of the tow bar between the operative and stowed positions effecting movement of the wheels between the operative and stowed positions.

Accordingly, the present invention provides a light weight utility trailer which may be readily and easily converted between operative and stowed configurations, the trailer comprising a bed or body pivotally carrying a stud shaft to which a tow bar is mounted, wheels at each side of the bed supported by a shaft pivotally connected to the bed, and means connecting the stud shaft to the wheel supporting shaft so that when the tow bar is rotated from its operative position extending from the front of the bed to a stowed position adjacent the bottom of the bed the wheel supporting shaft rotates through substantially the same angle and the wheels move from the operative position extending downwardly relative to the bottom of the bed to an inoperative position raised above the bottom of the bed and preferably within the profile of the sides of the bed so that the trailer may be stowed in a minimum of space on its tail end with neither the tow bar nor the wheels projecting beyond the profile of the bed. In the preferred embodiment, means are provided to bias the wheel support shall to rotate toward the operative position to aid in moving the wheels to the operative position as the tow bar is rotated toward the operative position from the stowed position, and to aid in moving the wheels toward the stowed position from the operative position.

Another aspect of the invention is the inclusion of fenders disposed above the wheels in the operative position and being pivotally mounted so that as the wheels are moved to the inoperative position, the fenders are contacted by the wheels and driven to a stowed position within the profile of the sides of the bed, there being means for urging the fenders to the operative position as the wheels are moved to the operative position.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
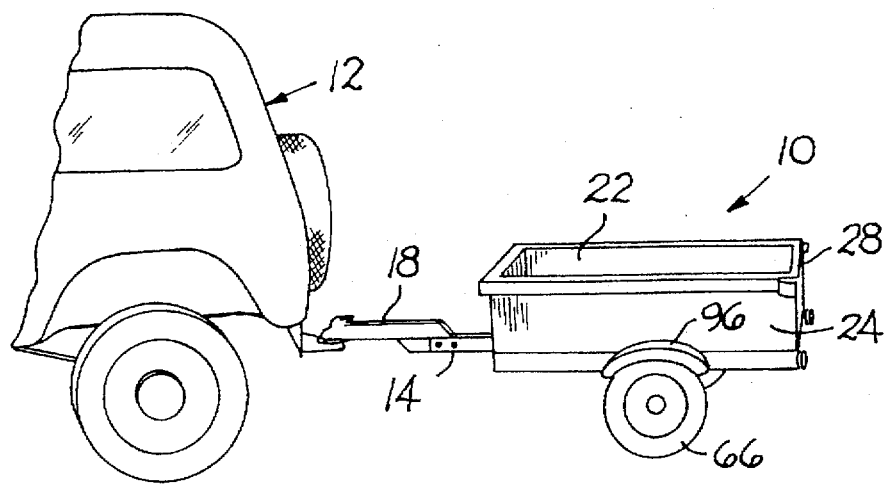
FIG. 1 is a perspective view of a utility trailer of the present invention mounted in the operative towing position at the rear of a vehicle, only a portion of the vehicle being illustrated.
Figure 3:
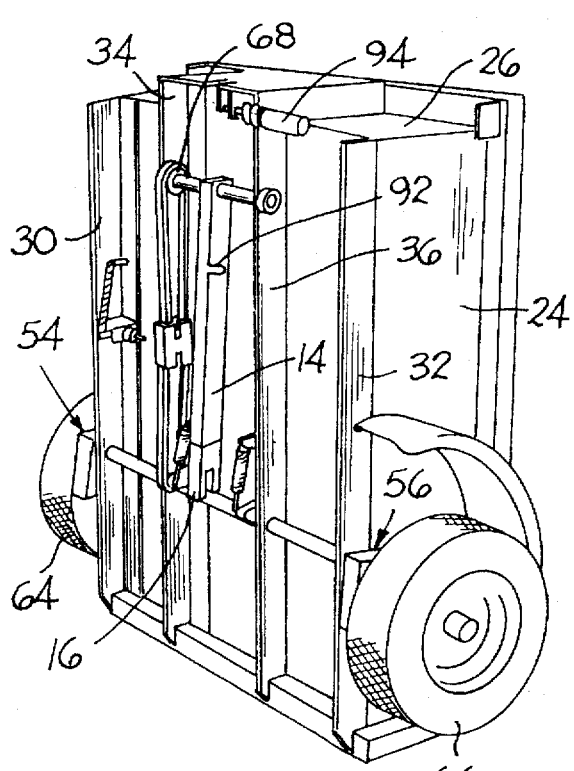
FIG. 3 is a view similar to FIG. 2 but at a different angle and with the components in the stowed position.

Referring now to the drawings, a utility trailer 10 constructed in accordance with the principles of the present invention is illustrated in FIG. 1 in the operative towing position behind a vehicle 12, the trailer having a tow bar 14 which, as illustrated in FIG. 3, has a bifurcated clevis 16 at the free end so that the tow bar may be readily connected to a lawn tractor, lawn mower or the like by means of a pin through the clevis or the trailer may be connected to a highway vehicle by means of an adapter 18 which attaches to the end of the clevis and to the conventional tow ball on the end of the vehicle. The trailer 10 comprises a bed or body having a floor 20 from which integrally secured sidewalls 22, 24 and a front end wall 26 extend upwardly, there additionally being a rear end wall 28 which may also be integral with the floor 20 but preferably is a lift-out tailgate, and may, if desirable, be hinged and pivoted relative to the floor.

Extending downwardly from the lower surface of the floor 20 in the front to rear or longitudinal direction at the location of each side wall 22, 24 is a respective rail 30, 32, each rail having a horizontal portion secured to the floor. While similar longitudinally extending rails 34, 36 project downwardly from the bottom of the floor in the central portion of the trailer, the rails 34, 36 being spaced apart and being spaced from the rails 30, 32. Spanning and journally mounted in beating members 38, 40 in the rails 34, 36 is a transversely extending stud shaft 42, the tow bar 14 being secured to the stud shaft 42 so that the tow bar may be rotated from the operative position extending forwardly from the front of the trailer to the stowed position adjacent the bottom of the floor, i.e., rotatable substantially 180 degrees. Spaced longitudinally from the shaft 42 is another transversely extending shaft 44 which is journalled in bearings 46, 48 in the rails 34, 36 and in bearings 50, 52 in the rails 30, 32 respectively, the shaft 44 comprising a wheel support shaft. The ends of the shaft 44 extend transversely beyond each rail 30, 32 and a wheel bracket 54, 56 is secured to the respective end. Each bracket 54, 56 is identical and in the preferred embodiment has a pair of legs 58, 60, the legs being 90 degrees apart. The legs 58 are secured to the shaft 44 while the legs 60 respectively mount a small axle 62 on which a respective wheel 64, 66 is journally mounted, the legs 60 extending substantially downwardly in the operative towed position so that the wheels may engage and locate along the surface of the ground or road.

In accordance with the present invention, means is provided for raising the wheels 64, 66 to the stowed position as the tow bar 14 is rotated to the stowed position. To this end the present invention secures a first sprocket 68 to the stud shaft 42 and a second sprocket 70 to the wheel support shaft 44, an endless chain 72 being trained about both sprockets. A chain tensioning device 74 preferably is included to take the slack out of the chain so that the chain is tight about the sprockets to prevent slipping of the chain on the sprockets. Thus, when the tow bar 14 is pivoted between the operative towing or forwardly extending position illustrated in FIG. 1 to the folded position illustrated in FIG. 3, the sprocket 68 and stud shaft 42 are rotated through 180 degrees to drive the chain 72. This results in rotation of the sprocket 70 and thus the shaft 44 in the same direction and through the same angle as the stud shaft 42.

As the shaft 44 rotates, the wheel brackets 54, 56 rotate therewith so that the legs 60 together with the wheels 64, 66 supported thereon rotate through the same angle. Thus, when the tow bar 14 is rotated from the operative towing position to the folded stowed position the legs 60 rotate about the axis of the shaft 44 to swing the wheels from the operative downwardly depending position below the bed of the trailer to an upward stowed position spaced above the bottom edge of the rails 30, 32, the wheels being off-set rearwardly in the stowed position relative to the operative position because of the lever arm effected by the off set legs of the bracket 54, 56. By providing wheels with a diameter no greater than the height of the sides 22, 24, the wheels in the raised position are within the profile of the trailer sides. Although the sprocket and chain drive construction is disclosed in the preferred embodiment, other drive means may be utilized. For example, a rack and pinion arrangement or other drive means for effecting rotation of the shaft 42 in response to rotation of the stud shaft 42 may be utilized without departing from the spirit of the invention.

Figure 4:
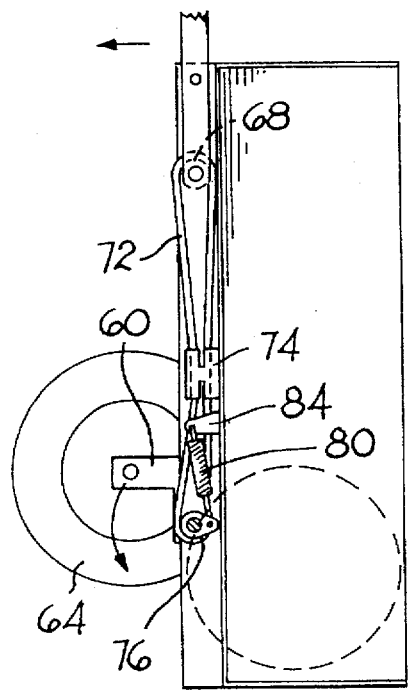
FIG. 4 is a cross sectional view taken substantially along the line 4—4 of FIG. 2.
Figure 7:
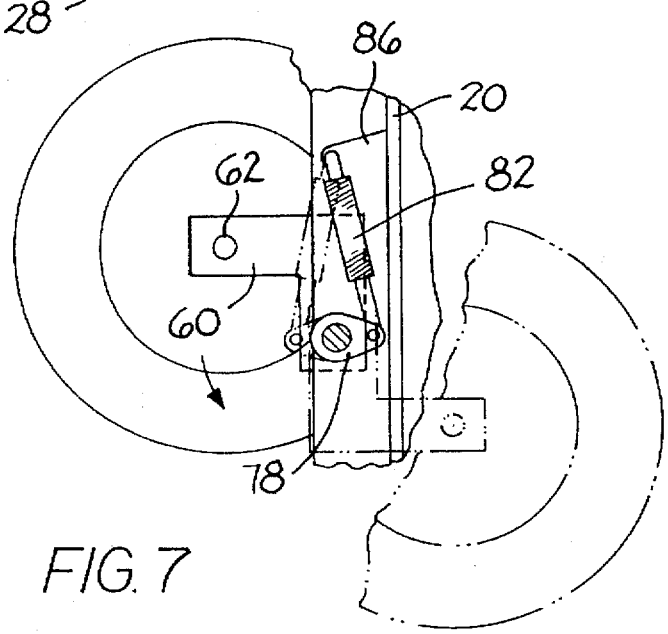
FIG. 7 is a cross sectional view taken substantially along line 7—7 of FIG. 2 illustrating the disposition of the wheel support shaft biasing means in the operative tow position in solid and the stowed position in phantom.

In order to aid in holding the wheels 64, 66 and the tow bar 14 in the stowed position, and also to aid in returning the wheels and the tow bar to the operative position, spring means are provided and fastened between the shaft 44 and the bed of the trailer. Thus, at least one and preferably two collars 76, 78 are secured to the shaft 44 and one end of a respective spring 80, 82 is connected to the collars, the springs in the preferred embodiment being small gas springs but any conventional spring may be employed. This end of each spring is connected to a portion of the respective collar spaced from the axis of the shaft 44 so as to form a small lever arm. In the operative position, the location of such connection is disposed between the shaft and the floor 20 of the bed as best illustrated in FIGS. 4 and 7. The other end of each spring is connected to a respective lug 84, 86 integral with a small bracket secured to the floor 20 or preferably, as illustrated, to the horizontal portion of the rails 34, 36 that are secured to the floor.

Thus, in the operative position the springs 80, 82 urge the collars and thus the shaft 44 counter-clockwise as illustrated in FIGS. 4 and 7. As the shaft 44 is rotated toward the stowed position the ends of the springs which are connected to the collars rotate with the collars clockwise, and when they reach approximately the half-way point in the travel, i.e., approximately 90 degrees, the springs swing to the over-center position. In the stowed position, the connection between the ends of the springs and the collars are approximately 180 degrees from the original operative position and urge the shaft 44 and thus the wheels 64, 66 and the tow bar 14 to the stowed position. The spring means thus holds the shaft 44 together with the wheels 64, 66, the chain 72, the stud shaft 42 and the tow bar 14 in either the operative tow position or the inoperative stowed position until the tow bar 14 is again manually rotated. When the tow bar is moved from the stowed position to the tow position beyond the half-way point, the springs aid in moving the elements including the wheels 64, 66 to the operative position.

Additionally, in the operative tow position the tow bar 14 may be locked against rotational movement by means of a plunger 88 biased by a spring 90 into a recess or slot 92 in the tow bar, a handle member 94 being manually grasped to pull and release the plunger from the tow bar.

Figure 2:
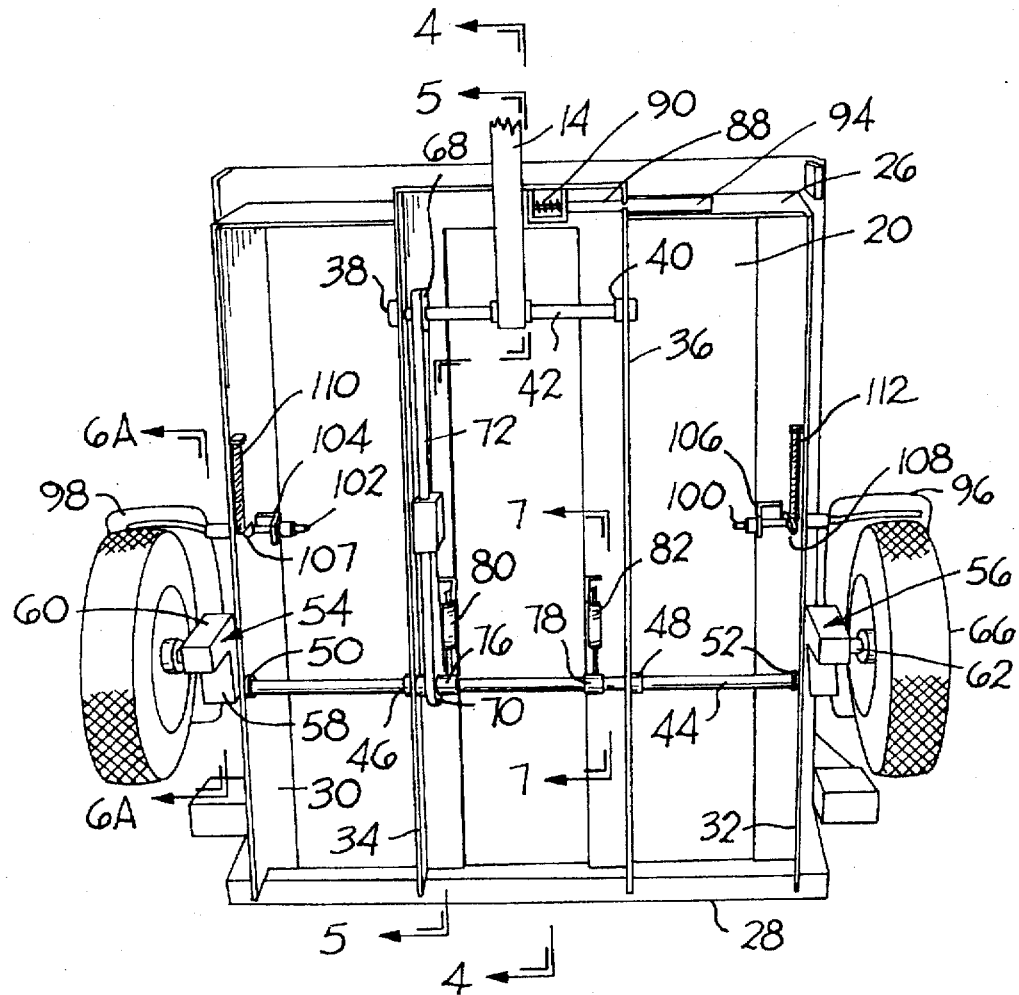
FIG. 2 is a fragmentary perspective view of the utility trailer disposed on its tail or rear end, but with the components of the trailer in the operative position.
Figure 6A:
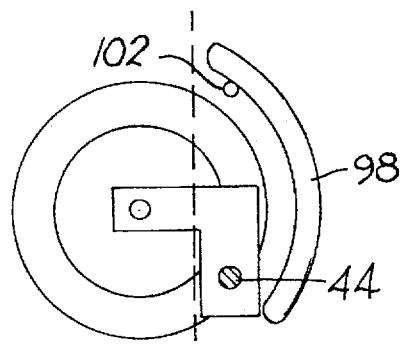
FIG. 6A through FIG. 6C depict the movement of the wheels and the fenders as they are moved from the operative to the stowed position respectively, FIG. 6B depicting an intermediate position.
Figure 6B:
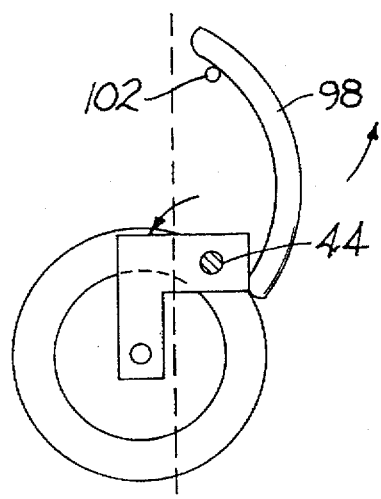
Figure 6C:
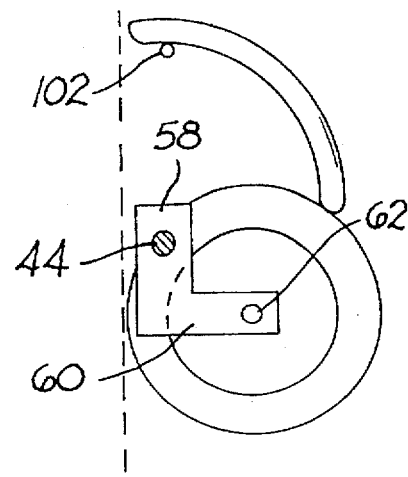
Figure 5:
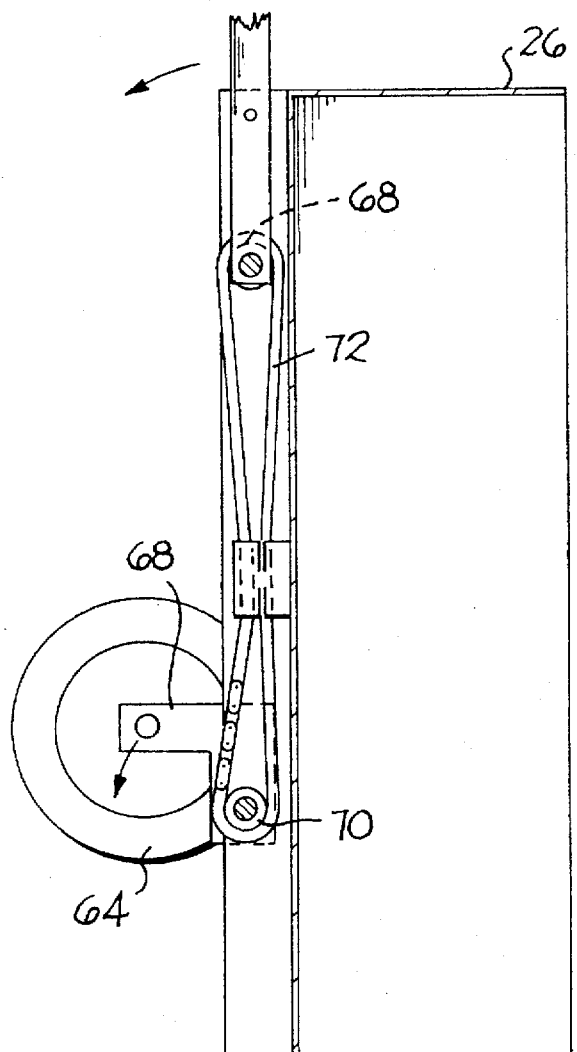
FIG. 5 is a cross sectional view taken substantially along the line 5—5 of FIG. 2.

For aesthetics and for preventing debris from being thrown by the wheels against the bed of the trailer, fenders 96, 98 are provided. Each fender is secured adjacent the front of the fender, as be welding or the like, to a respective shaft 100, 102 pivotally journalled in a respective lug 104, 106 integral with a small bracket fastened to the floor 20 or preferably, as illustrated, to the horizontal portion of the respective rail 30, 32. A collar 107, 108 similar to the collars 76, 78 is respectively fastened to the shafts 100, 102 and to one end of a respective spring 110, 112 having its other end fastened to the floor of the bed. The springs 110, 112 act to urge the collars 107, 108 and thus the shafts 100, 102 to rotate in the direction wherein the fenders are in the operative position above the wheels 64, 66 when the wheels are down or in the operative towed position. In this position the rear ends of the fenders are disposed above the respective wheels 64, 66 as illustrated in FIGS. 1, 2 and 6A. As the wheels move toward the stowed position the wheels engage the rear end of the fenders at approximately the mid-point of movement of the wheels, i.e., when the shaft 44 has rotated approximately 90 degrees as illustrated in FIG. 6B. Thereafter, as the wheels continue to move toward the stow position the bias of the springs 110, 112 are overcome by the wheels and the fenders are pivoted with the shafts 100, 102 in the lugs 104, 106 and drive the fenders to the stow position illustrated in FIGS. 3 and 6C. When the tow bar 14 is again rotated toward the operative tow position and the wheels rotate back toward the operative position, the springs 110, 112 force the fenders to follow the wheels until the fenders have returned to the operative position. Thus, the fenders are substantially automatically moved from the operative to the stow position in response to movement of the wheels.

Accordingly, the present invention provides a trailer which may be stored on its rear end in a minimum of floor space since the wheels, tow bar and fenders do not extend beyond the profile of the bed of the vehicle. As the tow bar is unfolded to the operative position, the wheels and fenders follow and when the tow bar is locked in the operative tow position, the wheels and fenders are in the operative position. Changing the configuration from tow to stow is thus readily accomplished in a rapid manner merely by moving the tow bar about the axis of the stud shaft 42.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A stowable trailer readily convertible between an operative towable configuration, and a stowable configuration, comprising a bed including a floor, a pair of opposite spaced apart sides, a front and a rear end, a tow bar having a free end extending from the front of the trailer when the trailer is in the operative towable configuration and a second end, a stud shaft, means for journally mounting said stud shaft beneath the floor, means for fastening said second end of said tow bar to said stud shaft for rotating said stud shaft and permitting said tow bar to be manually rotated from said operative configuration to a stowable position with the free end beneath said floor, a pair of wheels including at least portions extending beyond said floor in the operative configuration for engaging a road surface, one wheel extending beyond each side of said bed, a wheel support shaft, means for journally mounting said wheel support shaft beneath said floor spaced from said stud shaft, means for connecting said wheels to said support shaft for permitting said wheels to rotate relative to said support shaft, and motion transfer means responsive to rotation of said stud shaft for rotating said wheel support shaft relative to said bed when said bed is set on said rear end to move said wheels from the operative configuration to the stowable configuration with substantially no part of said wheel extending beyond said floor.

2. A stowable trailer as recited in claim 1, wherein said motion transfer means comprises a first drive member secured to said stud shaft, a second drive member secured to said wheel support shaft, and drive means for drivingly rotating said second drive member in response to rotation of said first drive member.

3. A stowable trailer as recited in claim 2, wherein said first and second drive members comprise sprockets, and said drive means comprises an endless chain trained about said sprockets.

4. A stowable trailer as recited in claim 1, wherein said trailer includes a fender disposed above each wheel in the operative position, means including a pivot shaft for pivotally connecting each fender to a respective side of said bed, means for urging each pivot shaft to dispose said fenders in the operative position, said fenders being disposed such that as said wheels move to the stowable configuration each wheel abuts a fender to overcome the urging of said pivot shaft and to rotate said pivot shaft and thus said fenders to a stowable position.

5. A stowable trailer as recited in claim 4, including biasing means for urging said wheel support shaft and said wheels toward said operative configuration until said tow bar has been manually rotated to a mid-position intermediate said operative position and said stowable position and thereafter for urging said wheel support shaft and said wheels toward said stowable configuration.

6. A stowable trailer as recited in claim 5, wherein said motion transfer means comprises a first drive member secured to said stud shaft, a second drive member secured to said wheel support shaft, and drive means for drivingly rotating said second drive member in response to rotation of said first drive member.

7. A stowable trailer as recited in claim 6, wherein said first and second drive members comprise sprockets, and said drive means comprises an endless chain tried about said sprockets.

8. A stowable trailer as recited in claim 1, wherein said means for connecting said wheels to said shaft includes a substantially L-shape bracket corresponding to each wheel, means for securing one leg of each bracket to said wheel support shaft, and means for rotatably journally a wheel to the other leg of each bracket, said other leg of each bracket extending beyond the bottom of said floor in the operative configuration and above the bottom of said floor in the stowable configuration.

9. A stowable trailer as recited in claim 8, including biasing means for urging said wheel support shaft and said wheels toward said operative configuration until said tow bar has been manually rotated to a mid-position intermediate said operative position and said stowable position and thereafter for urging said wheel support shaft and said wheels toward said stowable configuration.

10. A stowable trailer as recited in claim 9, wherein said motion transfer means comprises a first drive member secured to said stud shaft, a second drive member secured to said wheel support shaft, and drive means for drivingly rotating said second drive member in response to rotation of said first drive member.

11. A stowable trailer as recited in claim 10, wherein said first and second drive members comprise sprockets, and said drive means comprises an endless chain trained about said sprockets.

12. A stowable trailer as recited in claim 9, wherein said biasing means comprises spring means connected to said wheel support shaft and to said bed.

13. A stowable trailer as recited in claim 12, wherein said trailer includes a fender disposed above each wheel in the operative position, means including a pivot shaft for pivotally connecting each fender to a respective side of said bed, means for urging each pivot shaft to dispose said fenders in the operative position, said fenders being disposed such that as said wheels move to the stowable configuration each wheel abuts a fender to overcome the urging of said pivot shaft and to rotate said pivot shaft and thus said fenders to a stowable position.

14. A stowable trailer as recited in claim 13, wherein said motion transfer means comprises a first drive member secured to said stud shaft, a second drive member secured to said wheel support shaft, and drive means for drivingly rotating said second drive member in response to rotation of said first drive member.

15. A stowable trailer as recited in claim 14, wherein said first and second drive members comprise sprockets, and said drive means comprises an endless chain trained about said sprockets.

16. A stowable trailer readily convertible between an operative towable configuration, and a stowable configuration, comprising a bed including a floor, a pair of opposite spaced apart sides, a front and a rear end, a tow bar having a free end extending from the front of the trailer when the trailer is in the operative towable configuration and a second end, a stud shaft, means for journally mounting said stud shaft beneath the floor, means for fastening said second end of said tow bar to said stud shaft for rotating said stud shaft and permitting said tow bar to be manually rotated from said operative configuration to a stowable position with the free end beneath said floor, a pair of wheels including at least portions extending beyond said floor in the operative configuration for engaging a road surface, one wheel extending beyond each side of said bed, a wheel support shaft, means for journally mounting said wheel support shaft beneath said floor spaced from said stud shaft, means for connecting said wheels to said support shaft for permitting said wheels to rotate relative to said support shaft, and motion transfer means responsive to rotation of said stud shaft for rotating said wheel support shaft relative to said bed when said bed is set on said rear end to move said wheels from the operative configuration to the stowable configuration with substantially no part of said wheel extending beyond said floor, including biasing means for urging said wheel support shaft and said wheels toward said operative configuration until said tow bar has been manually rotated to a mid-position intermediate said operative position and said stowable position and thereafter for urging said wheel support shaft and said wheels toward said stowable configuration.

17. A stowable trailer as recited in claim 16, wherein said motion transfer means comprises a first drive member secured to said stud shaft, a second drive member secured to said wheel support shaft, and drive means for drivingly rotating said second drive member in response to rotation of said first drive member.

18. A stowable trailer as recited in claim 17, wherein said first and second drive members comprise sprockets, and said drive means comprises an endless chain trained about said sprockets.

19. A stowable trailer as recited in claim 16, wherein said biasing means comprises spring means connected to said wheel support shaft and to said bed.

* * * * *